United States Patent [19]

Moritz

[11] Patent Number: 4,769,985
[45] Date of Patent: Sep. 13, 1988

[54] GUIDE CHAIN

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 914,052

[22] Filed: Oct. 1, 1986

[30] Foreign Application Priority Data

Oct. 4, 1985 [DE] Fed. Rep. of Germany ... 8528258[U]

[51] Int. Cl.⁴ ............................................. F16G 13/16
[52] U.S. Cl. ...................................... 59/78.1; 248/49; 248/68.1
[58] Field of Search .................... 59/78.1, 900; 248/48, 248/49, 50, 51

[56] References Cited

U.S. PATENT DOCUMENTS

| | | | |
|---|---|---|---|
| 2,975,807 | 3/1961 | Wanninger | 59/78.1 |
| 3,330,105 | 7/1967 | Weber | 59/78.1 |
| 3,382,668 | 5/1968 | Berkes et al. | 59/78.1 |
| 4,104,871 | 8/1978 | Moritz | 59/78.1 |
| 4,590,961 | 5/1986 | Schumann | 59/78.1 |

FOREIGN PATENT DOCUMENTS

| | | |
|---|---|---|
| 0126862 | 12/1984 | European Pat. Off. |
| 2134878 | 2/1973 | Fed. Rep. of Germany . |
| 2221826 | 11/1973 | Fed. Rep. of Germany . |
| 2255283 | 6/1975 | Fed. Rep. of Germany ....... 59/78.1 |
| 8213664 | 5/1982 | Fed. Rep. of Germany ....... 59/78.1 |
| 3318365 | 11/1984 | Fed. Rep. of Germany ....... 59/78.1 |
| 7314712 | 4/1974 | France . |
| 7336071 | 6/1974 | France . |

Primary Examiner—Robert L. Spruill
Assistant Examiner—David B. Jones
Attorney, Agent, or Firm—Becker & Becker, Inc.

[57] ABSTRACT

A guide chain for carrying transmission lines, feed lines, and other energy lines, especially cables and hoses, from a fixed connection to a movable consuming device. The guide chain includes a plurality of chain links that include a U-shaped receiving member, the legs of which form outer side pieces, and that also include a closure member that can be connected to the free edges or sides of the side pieces. With minimum play and friction, the guide chain carries energy lines of various dimensions with negligible wear. When the closure member is opened, a complementarily shaped insert can be placed in the receiving member. When the closure member is closed, the periphery of the insert is supported on all sides. The insert is positively connected with the chain link when the closure member is closed via guide ribs and guide grooves. The insert is provided with openings which, when the insert is positively connected, are oriented along the longitudinal axis of the guide chain when the latter is in the extended state. These openings accommodate energy lines.

7 Claims, 2 Drawing Sheets

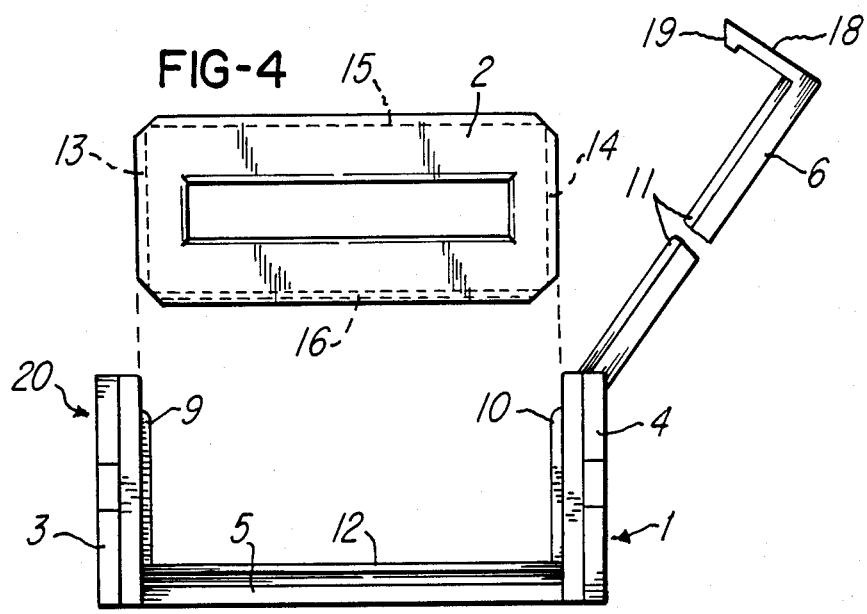
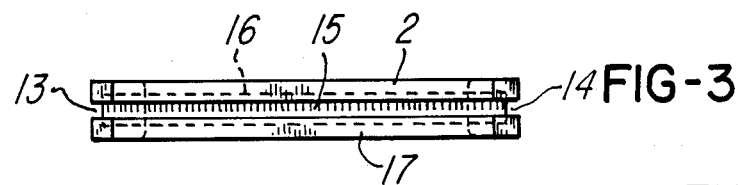
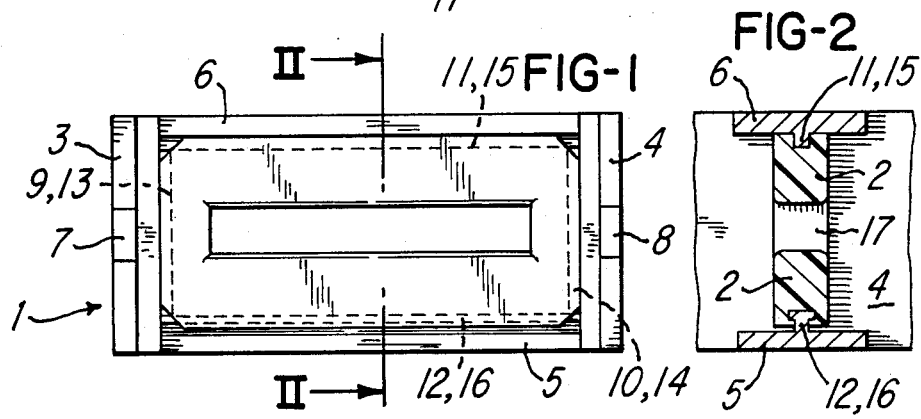
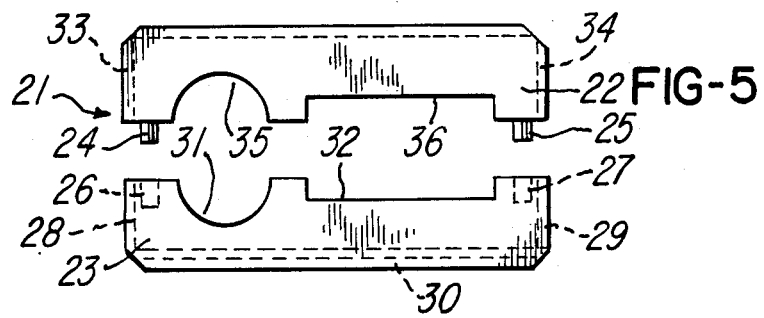

GUIDE CHAIN

BACKGROUND OF THE INVENTION

1. Field of the Invention

The present invention relates to a guide chain for carrying transmission lines, feed lines, and other energy lines, especially cables and hoses, from a fixed connection to a movable consuming device. The guide chain includes a plurality of chain links that comprise a U-shaped receiving member, the legs of which form outer side pieces, and that also comprise a closure member that can be connected to the free edges or sides of the side pieces.

2. Description of the Prior Art

U.S. Pat. No. 4,570,437-Moritz dated Feb. 18, 1986 belonging to the assignee of the present invention and corresponding to German Offenlegungsschrift No. 33 18 365 Moritz dated Nov. 22, 1984 discloses a guide chain of the aforementioned general type where the receiving member can be closed off by a closure member that is connected to one outer side piece via a hinge joint, and can be secured to the other outer side piece via an elastic hook. After the closure member has been opened, the chain links can be assembled or disassembled without the necessity for having to disassemble the energy supply chain into individual components. Nevertheless, the carrying capacity of this guide chain is considerable. However, this heretofore known guide chain has the drawback that the energy lines are subject to sliding within the receiving member, so that during operation, frictional forces, tensile forces, and jerk-like stresses can lead to considerable wear of the energy lines and of the chain links.

U.S. Pat. No. 4,570,437-Moritz dated Feb. 18, 1986 belonging to the assignee of the present invention and corresponding to German Pat. No. 22 55 283 Moritz dated June 5, 1975 discloses a guide chain having outer side pieces that are connected by at least two crosspieces, between which are disposed separators for the energy lines. The crosspieces have a flattened cross-sectional shape with rounded-off narrow sides, and in the separators, at the upper and lower ends, chamfered recesses having undercuts are disposed, so that after being placed in the recesses, the crosspieces, by being twisted about their longitudinal axes, can be positively connected with the separators in a force-locking manner. With these heretofore known energy chains if or reasons of stability, the outer side pieces and the crosspieces are made of metal, thus resulting in a very high weight for the chain. A further drawback of this heretofore known guide chain is that the chain links thereof must each consist of a number of individual parts. Furthermore, although the energy lines are protected from contacting one another due to the separators, in operation these energy lines are subjected to wear due to the relative movements between them and the separators and crosspieces.

Based on the above, it is an object of the present invention to provide a guide chain having chain links that are comprised of few parts, have a high rigidity and a low weight, that can be assembled or disassembled individually, and that, with minimum play and friction, carry energy lines of very different dimensions and surface structures, with operational wear being negligible.

BRIEF DESCRIPTION OF THE DRAWINGS

This object, and other objects and advantages of the present invention, will appear more clearly from the following specification in conjunction with the accompanying schematic drawings, in which:

FIG. 1 is a view that illustrates one exemplary embodiment of the inventive guide chain showing a chain link with an inserted cartridge or insert and with the closure member being closed, and viewed in the direction of the longitudinal axis of the extended guide chain;

FIG. 2 is a cross-sectional view of the chain link of FIG. 1 taken along the along II—II thereof;

FIG. 3 is a plan view of the insert of FIG. 1;

FIG. 4 is a view that illustrates the chain link of FIG. 1 with the closure member opened and an insert in a position for introduction into the receiving member;

FIG. 5 is a view that shows an insert that can be taken apart and that is provided with openings for a round end box-type energy line.

SUMMARY OF THE INVENTION

Figure 6:
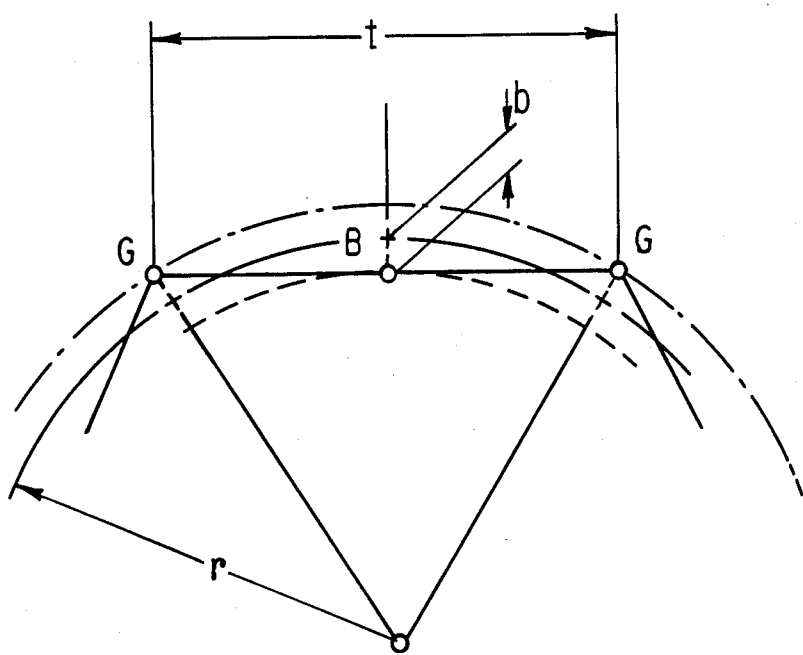
FIG. 6 is a view that schematically illustrates a portion of an inventive guide chain having a radius of curvature "r".

The guide chain of the present invention is characterized primarily in that when the closure member is opened, a complementarily shaped cassette or insert can be placed into the receiving member, with the periphery of this insert being supported on all sides when the closure member is closed; in that the insert, when the closure member is closed, being positively connected with the chain link via guide elements, such as guide ribs and guide grooves; and in that the insert is provided with openings which, when the insert is positively connected, are oriented along the longitudinal axis of the extended guide chain and accommodate the energy lines.

The inventive guide chain has the advantage that the receiving member and the closure member form a base body into which can be inserted cassettes or inserts that are adapted to respective applications. With regard to conceivable applications, where the energy lines and chain links are subjected to little stress, it is possible to operate the chain links without inserts. On the other hand, where the chain links are subjected to unfavorable operating conditions, they can be provided with inserts that are intentionally provided as replaceable and expendable parts. Other applications are also conceivable in which only some of the chain links are provided with an insert. A particular advantage is that the base body can be optimized with regard to the rigidity and the kinematic properties of the guide chain, and independently therefrom, it is possible to optimize the insert with regard to carrying the energy lines with minimum wear. Since with the present invention there is a clear separation between the functions of the base body and of the insert, the up to now frequently required preparation of the base body is eliminated. As a result, in each application, the starting point is a uniform rigidity of the guide chain. With regard to the base body, the manufacture of guide chains has the advantage of having a uniform and standard production plan, and a simplified storage. The inserts, in conformity to specific desires of customers, can be economically extruded or injection molded from plastic, with a die having to be adapted only to the openings for the respective application. Since the insert nearly completely fills the box-like cross-sectional area of the chain link, a further advantage is that an improvement of the torsional rigidity of the guide chain is achieved.

It is possible to disassemble or assemble individual chain links, and to retrofit the guide chain with further energy lines, without having to take the guide chain apart into individual chain links.

Pursuant to one exemplary embodiment of the present invention, the insert is connected to the receiving member or closure member on at least two opposite peripheral sides via guide ribs and guide grooves. In this way, a uniform introduction of force is achieved from the insert into the chain link.

Pursuant to a further inventive embodiment, the insert can be arrested in the base of the receiving member via an arresting rib and an arresting groove. As a result of this arresting action, on the one hand, the force exerted by the insert upon the closure member is reduced, and on the other hand the nondetachability of the preassembled insert is assured even when the closure member is opened.

A further specific embodiment of the present invention provides that when the insert is positively connected, the axes of symmetry of the openings of the insert are spaced at a distance from a plane that intersects the two pivot axes of the chain link, whereby at this distance in the radius of curvature of the guide chain, the arc length of the energy lines conforms precisely to the chain pitch or division. This minimizes the relative movement of the energy lines, since the latter are disposed in the neutral axis of the chain links.

Pursuant to another exemplary embodiment of the present invention, the insert may comprise a soft plastic that is particularly smooth for the energy lines, such as polyethylene, thus considerably reducing the wear of the energy lines.

Pursuant to another inventive embodiment, the insert can be separable in a plane which completely intersects the openings in the longitudinally extended direction, with the insert being separable into an upper part and a lower part. By preassembling the lower part, insertion of the energy lines is considerably simplified. Mutual contact surfaces of the upper part and the lower part can be provided with complementarily shaped guide elements, such as guide pins and guide holes. In this way, the upper part and the lower part can be preassembled in a nondetachable manner.

Finally, it is proposed pursuant to another specific embodiment of the present invention that the closure member be pivotably connected to one of the outer side pieces, while it can catch on the other side piece, thus considerably simplifying assembly of the guide chain.

Further specific features of the present invention will be described in detail subsequently.

DESCRIPTION OF PREFERRED EMBODIMENTS

Referring now to the drawings in detail, FIGS. 1 and 2 illustrate a chain link 1 in which a cartridge or insert 2 has been placed. The chain link 1 comprises a U-shaped receiving member having outer legs or side pieces 3, 4 on a base 5, and also comprises a closure member 6. At one end, on both sides, the chain link 1 is provided with link-joint holes 7,8, and at the other end, on both sides, is provided with non-illustrated link pins. The holes 7, 8 and the link pins make it possible to assemble a guide chain, with the link pins being introduced into the link-joint holes of the adjacent chain link.

The periphery of the insert 2 is supported on all sides, thus preventing movement of the insert in the plane of the drawing. Movements at right angles to the plane of the drawing are prevented by guide ribs 9,10, 11 and an arresting rim 12 on the base 5, as well as by complementarily shaped guide grooves 13, 14, 15 and an arresting groove 16 on the insert 2.

To accommodate one or more box-type transmission lines, feed lines, or other energy lines, the insert 2 is provided with a slot 17 that is oriented along the longitudinal axis of the extended guide chain. It would also be possible to accommodate several energy lines that have a circular cross-sectional shape, with the diameter thereof not differing much from the height of the slot 17. The important thing is that the energy lines by disposed in the neutral axis of the chain link, with this neutral axis being disposed in a plane that intersects the two pivot axes of the chain link. In the illustrated embodiment, a starting point is that the link-joint holes 7,8 and the pivot pins of the chain link are disposed at the same perpendicular distance from a plane that is parallel to the base 5, so that the neutral axis is disposed at the level of the axis of connection of the holes 7 and 8. Energy lines that are guided within the chain links at the level of the neutral axis are subjected to particularly little wear, since their movements within the guide chain are negligible.

In FIG. 4, the closure member 6, which is pivotably connected to the side piece 4, is illustrated in the opened position. The free end of the closure member 6 is provided with a hook-like element 18, the catch 19 of which can be secured in a recess of the side piece 3. However, before the chain link is closed to form a box-like profile, the insert 2 can be inserted for low-wear guidance of energy lines. Via the guide grooves 13, 14 on its sides, the insert 2 slides along the guide ribs 9, 10 into the intended position wihin the receiving member 20 formed by the legs 3, 4 and the base 5. On the base 5, the arresting rib 12 catches in the arresting groove 16 of the insert 2. This assures that an insert 2 that has been introduced into a closure member 6 will not become detached, even when the closure member is opened. Also as a result of this configuration, an additional portion of the forces emanating from the energy lines is introduced into the base 5 of the chain link 1. Finally, when the closure member 6 is closed, the guide rib 11 occupies the guide groove 15, so that the insert 2 is secured on all sides.

FIG. 5 illustrates a cartridge or insert 21 that can be advantageously used for acommodating not only an energy line that has a circular cross-sectional shape, but also an energy line that has a rectangular cross-sectional shape. The insert 21 is embodied in two parts, namely an upper part 22 and a lower part 23 that are aligned with one another via guide pins 24, 25 and guide holes 26, 27. With suitable tolerance values for the guide pins and guide holes, the upper part 22 and the lower part 23 an also be preassembled in a nondetachable manner. To simplify assembly, the guide grooves 28, 29 of the lower part 23 are first introduced along the guide ribs 9, 10 of a receiving member 20, and the arresting rib 12 catches with the arresting groove 30. The energy lines can then be placed into the semicircular groove 31 and the rectangular groove 32. The upper part 22, with its guide grooves 33, 34, is thereupon introduced and brought to bear against the lower part 23 with the semi-circular groove 35 and the rectangular groove 36 of the upper part 22 enclosing the energy lines. Finally, the upper part 22 and the lower part 23 are secured in the previously described manner by closing the closure member 6.

Other embodiments of the closure member are also conceivable. For example, it is not necessary to connect one side of the closure member to a side piece. Instead, both sides could be provided with hook-like elements and catches that could be received in recesses of the side pieces.

The U-shaped receiving member and the closure member are expediently made of a glass-fiber-reinforced plastic. Such main bodies have a particularly high rigidity. The inserts can be particularly advantageously extruded or injection molded from a plastic that presents a particularly low frictional resistance to the energy lines. Extrusion or injection molding make it possible to accommodate specific desires of customers in a particularly rapid manner.

The guide chain of FIG. 6 has a radius of curvature "r", and comprises chain links that extend between two pivot axes G. When the axes of symmetry of the openings have a distance "b" from a plane that connects the two pivot axes G, no relative movement of the energy lines takes place in the insert. The arc length B of the energy lines then equals the chain pitch or division "t".

The present invention is, of course, in no way restricted to the specific disclosure of the specification and drawings, but also encompasses any modifications within the scope of the appended claims.

What I claim is:

1. A guide chain for carrying energy-type lines from a fixed connection to a movable consuming device, said guide chain comprising:

a plurality of chain links including means to interconnect them with a chain pitch in a predetermined relationship for movement therewith, each of which in turn comprises a U-shaped receiving member with a base and two side pieces, and a closure member that can be connected to said side pieces; each of said chain links having a closed position, in which said closure member blocks access to the interior of said receiving member, and an open position, in which access to said receiving member is not blocked by said closure member; and for each of at least some of said receiving members, a respective complementarily shaped interchangeable cartridge insert that is placed in said receiving member in said open position of that chain link and that is adapted to respective applications as a replaceable and expendable part; when a chain link in which has been placed in insert is in said closed position, the periphery of that insert is supported on all sides, and said insert is positively connected with said chain link via guide means; each of said inserts being provided with opening means having axes of symmetry for accommodating said energy type lines; in said closed position of a chain link in which has been placed an insert, said opening means of the latter being oriented along the longitudinal axis of said guide chain when the latter is in an extended state so that minimum play and friction occur with minimum wear for the energy-type lines via said insert;

said guide means comprising complementarily shaped guide ribs and guide grooves provided to fit in mating relationship with respect to each other on said cartridge inset and on at least one of said closure member and said receiving member respectively; and furthermore said closure member is pivotably connected to one of said side pieces of said receiving member, and can be secured to the other of said side pieces thereof.

2. A guide chain according to claim 1, in which said guide means are provided on at least two opposite outer lateral sides of said cartridge insert fitted in said U-shaped receiving member for complementary engagement with said closure member and said receiving member respectively.

3. A guide chain according to claim 1, in which said guide means includes an arresting rib as well as an arresting groove on said cartridge insert and on said base of said receiving member engageable with each other respectively to provide for complementary arresting interengagement of said cartridge insert in said receiving member.

4. A guide chain according to claim 1, in which each of said chain links has means at one end on each of opposite lateral sides to form link-joint holes for formation of and definition of two pivot pin axes; in said closed position of a chain link in which has been placed the cartridge insert, the axes of symmetry of said opening means being spaced from a plane that intersects both of said pivot axes by a distance whereby, in the radius of curvature of said guide chain, the arc length of said energy-type lines corresponds exactly to the chain pitch.

5. A guide chain according to claim 1, in which said insert is made of a soft plastic that is particularly smooth for said energy-type lines.

6. A guide chain according to claim 5, in which said plastic is polyethylene.

7. A guide chain according to claim 1, in which said insert comprises an upper part and a lower part that are connectable along a plane that in the longitudinally extended direction completely intersects said opening means.

* * * * *